(12) United States Patent
Brent (10) Patent No.: US 6,596,983 B2
(45) Date of Patent: Jul. 22, 2003

(54) PERIMETRIC DETECTION SYSTEM AND AUTOMATED CONTAINER

(76) Inventor: Mark R. Brent, 5849 Ocean View Dr., Oakland, CA (US) 94618

( * ) Notice: Subject to any disclaimer, the term of this patent is extended or adjusted under 35 U.S.C. 154(b) by 36 days.

(21) Appl. No.: 09/865,795

(22) Filed: May 25, 2001

(65) Prior Publication Data

US 2001/0045512 A1 Nov. 29, 2001

Related U.S. Application Data (60) Provisional application No. 60/207,676, filed on May 26, 2000.

(51) Int. Cl.$^7$ .......................... G06M 7/00; H01J 40/14; E05F 15/20; B65D 43/12; B65D 1/00
(52) U.S. Cl. ................. 250/221; 220/345.1; 220/345.5; 220/908; 160/7; 250/222.1; 250/239
(58) Field of Search .............................. 160/1, 9, 7, 19, 160/23.1, 25, 31, 238, 255, 313; 220/345.5, 350, 345.1, 262, 908; 359/592, 619, 641, 742; 385/89, 115, 116; 250/221, 222.1, 239, 341.7, 216

(56) References Cited

U.S. PATENT DOCUMENTS

| | | |
|---|---|---|
| 4,042,821 A | 8/1977 | Mierzwinski |
| 4,044,250 A | 8/1977 | Fetzer |
| 4,052,120 A | 10/1977 | Sick et al. |
| 4,092,642 A | 5/1978 | Green et al. |
| 4,207,466 A | 6/1980 | Drage et al. |
| 4,234,096 A | 11/1980 | Hergaux |
| 4,266,124 A | 5/1981 | Weber et al. |
| 4,335,316 A | 6/1982 | Glanz et al. |
| 4,434,363 A | 2/1984 | Yorifuji et al. |
| 4,560,912 A | 12/1985 | Jönsson |
| 4,590,410 A | 5/1986 | Jönsson |
| 4,621,452 A | 11/1986 | Deeg |
| 4,625,115 A | 11/1986 | Guscott |
| 4,659,922 A | 4/1987 | Duncan |
| 4,729,490 A * | 3/1988 | Ziegenbein |
| 4,820,030 A | 4/1989 | Griffin |
| 4,851,746 A | 7/1989 | Milke |
| 4,853,531 A | 8/1989 | Rejc |
| 4,864,121 A | 9/1989 | Pietzsch |
| 4,875,761 A | 10/1989 | Fetzer |
| 4,880,980 A | 11/1989 | Müller et al. |
| 4,888,532 A | 12/1989 | Jönsson |
| 4,893,005 A | 1/1990 | Stiebel |
| 4,894,952 A | 1/1990 | Trett et al. |

(List continued on next page.)

FOREIGN PATENT DOCUMENTS

| | | |
|---|---|---|
| DE | 29823796 | 2/2000 |

OTHER PUBLICATIONS

Touchless Smart Trashcan™ Personal Size; Sold by iTouchless.com of Millbrae, California. See http://www.itouchless.com/share/cgi-bin/site.cgi?site_id=itouchless&page_id=trashcan Printed Jun. 28, 2002.

Touchless Smart Trashcan™ Family Size; Sold by iTouchless.com of Millbrae, California. See http://www.itouchless.com/share/cgi-bin/site.cgi?site_id=touchless&page_id=trashcanlarge Printed Jun. 28, 2002.

*Primary Examiner*—David Porta
*Assistant Examiner*—David C Meyer
(74) *Attorney, Agent, or Firm*—Lucash, Gesmer & Updegrove, LLP (57) ABSTRACT

Systems and elements are disclosed for creating a continuous, collimated detection zone for an automatically-actuated device or container, such as an automatic waste container, wherein the detection zone can be made to match the opening periphery of the container, is height adjustable, immune from ambient light fluctuations and relatively simple and inexpensive to produce.

18 Claims, 7 Drawing Sheets

U.S. PATENT DOCUMENTS

| | | |
|---|---|---|
| 4,980,547 A | 12/1990 | Griffin |
| 4,981,275 A | 1/1991 | Sheu |
| 4,996,467 A | 2/1991 | Day |
| 5,003,169 A | 3/1991 | Sakaguchi et al. |
| 5,008,530 A | 4/1991 | Ball |
| 5,015,840 A | 5/1991 | Blau |
| 5,080,457 A | 1/1992 | Fetzer et al. |
| 5,198,661 A | 3/1993 | Anderson et al. |
| 5,210,406 A | 5/1993 | Beran et al. |
| 5,276,391 A | 1/1994 | Jönsson |
| 5,295,605 A * | 3/1994 | Kawahito et al. |
| 5,302,942 A | 4/1994 | Blau |
| 5,321,490 A | 6/1994 | Olson et al. |
| 5,329,212 A | 7/1994 | Feigleson |
| 5,393,973 A | 2/1995 | Blau |
| 5,410,149 A | 4/1995 | Winston, Jr. et al. |
| 5,414,256 A * | 5/1995 | Gurner et al. |
| 5,424,533 A | 6/1995 | Schmutz |
| 5,461,227 A | 10/1995 | Blau |
| 5,492,238 A | 2/1996 | Scholl et al. |
| 5,539,198 A | 7/1996 | McMichael et al. |
| 5,575,550 A | 11/1996 | Appeldorn et al. |
| 5,610,391 A | 3/1997 | Ringlien |
| 5,654,831 A | 8/1997 | Byren et al. |
| 5,770,935 A | 6/1998 | Smith et al. |
| 5,805,288 A | 9/1998 | Simmons et al. |
| 5,932,982 A * | 8/1999 | Pezelli, Jr. |
| 6,150,939 A | 11/2000 | Lin |
| 6,166,371 A * | 12/2000 | Milbrath et al. |

* cited by examiner

PERIMETRIC DETECTION SYSTEM AND AUTOMATED CONTAINER

REFERENCE TO RELATED APPLICATION

This application claims the priority of related U.S. provisional application Ser. No. 60/207,676 filed May 26, 2000, the disclosure of which is incorporated by reference herein in its entirety.

FIELD OF THE INVENTION

The present invention relates generally to systems for detecting objects, and, more particularly, relates to photodetector systems and automatically actuated devices utilizing such systems.

BACKGROUND OF THE INVENTION

It is desirable to have lids on waste containers to contain unpleasant sights and odors, and to protect against contamination from objects therein. Various waste containers with hand-operated lids have been developed, but suffer from inconvenience in use and risk of contamination when touched. Foot-operated designs minimize contamination risk, but are also often inconvenient or bothersome to use. Users of both hand and foot operated waste containers may be occupied with multiple tasks, or be situated in an inconvenient position, and not have a free hand or foot to operate the container lid.

Automatic cans of two general types have been developed. One type uses a proximity detector (e.g., pressure-sensitive mat or photoelectric detector) to sense the presence of a user in the vicinity of the container and actuate motor-driven door(s) to open. Doors generally close after a predetermined time period of non-detection. This type of automatic can is readily prone to false alarms from passing objects or persons.

The second type of automatic trash container has a physical 'bay', which objects must enter prior to passing through the automatic door of the container. The bay has one or more infrared beam emitters and detectors. Objects in the bay reflect beams of the infrared light zone and cause the motor-actuated door to open. The walls of the bay shield against detection of objects outside the bay.

Elimination of false alarms is improved with this type, but 'false negatives', or the non-detection of objects in the bay, is possible if objects are situated outside the zone.

Additionally, the requirement for an inner bay compromises the automatic waste container's ability to contain contaminating objects and noxious emissions to the cants shielded interior. The inner periphery of the bay, which may become contaminated, is exposed. It is difficult to avoid this condition when a shielded photoelectric detection zone is created in front of an opening. The zone must be offset some distance from the door by an exposed physical structure so the door can be opened before incoming objects make contact. For the user to pause while the door opens is inconvenient, so the comfortable zone offset distance is significant.

What is required is an automatic waste container that creates a non-physical detection zone, with a precisely controlled configuration to minimize false triggerings. For a can with an upward-facing opening, the detection zone should be a continuous, vertical 'curtain' matching the profile of the opening periphery, so only objects crossing the virtual, vertically-extended boundary of the opening activate the can. This configuration reduces the detection zone boundary to a logical minimum, thereby substantially decreasing unintentional triggerings. It is also desirable for the height of the detection zone to be adjustable by the user in order to avoid false triggerings by the presence of nearby structure, objects or zones of activity situated in the area above the can.

Diffuse light curtains, with continuous sensing ability, are known in various applications. They generally utilize diverging or scanning beam, infrared emitters and photodetectors to create continuous zones of detection by sensing reflected emissions from intruding objects. Emissions may be pulsed at a fixed frequency, and electronic and logic circuitry so configured, so as to filter out all received radiation not at the emitter frequency. This curtails false triggerings, as well as variations in detector sensitivity caused by fluctuations in ambient lighting conditions.

Light curtains have been used in industry to create safety zones around operating machinery that initiate immediate shutdown signals, or other safety protocols, when the zones are transgressed. Other applications include detection systems for sensing moving objects on a conveyor belt or breaks in fabric in textile manufacturing machines. Light curtain detection systems have also been employed for monitoring passing vehicles on traffic thoroughfares. Intruder alarm systems, used in various security applications, have also utilized light curtains for defining detection zones. Another application is the use of light curtains to control automatic, pedestrian doors when prescribed zones around the doors are entered.

Light curtains have been developed that utilize both diverging and non-diverging, or collimated, beampaths. It is conceivable that technology developed for other light curtain applications may be applied towards developing the light curtain configuration required for an improved automatic waste container. However, known light curtain technology has several drawbacks when considered for this application.

Even where light curtains are collimated to create planar detection zones, no provision is described in the prior art for creating a single, continuous light curtain circumscribing a prescribed area.

Multiple, planar light curtains may be combined to create a polygonal boundary, but this can only approximate curved, non-polygonal perimeters. Additionally, the cost and complexity of combining multiple light curtains created by prior art technology to enclose a defined area is prohibitive when considered for the current goal of creating an inexpensive, automatic waste container.

Thus it is desirable to create a low-cost, robust, reliable detection system suitable for use in connection with automatically-actuated containers, such as waste containers.

SUMMARY OF THE INVENTION

The current invention describes a system for creating a continuous, collimated detection zone for an automatically-actuated device or container, such as an automatic waste container, wherein the detection zone can be made to match the opening periphery of the container, is height adjustable, immune from ambient light fluctuations and relatively simple and inexpensive to produce. Though numerous types and arrangements of automatic doors may be used, one configuration is described herein that utilizes flexible, sliding doors that minimize system complexity and volume of space required for operation.

A detection system in accordance with the invention includes a vertical, collimated, continuous light curtain of emitted infrared pulses that circumscribes the container opening. Infrared-sensitive phototransistors, mounted in locations around the container rim surface, detect reflections of emitted radiation from the surfaces of objects passing through the light curtain. The detectors may also be located subsurface, and have associated lens elements to concentrate infrared reflections onto them. Spurious detections due to ambient light fluctuations are minimized by electronic circuitry that filters out all received radiation not at the emitted frequency. The effective height of the detection zone is adjustable by varying the emitted radiation intensity and/or detector sensitivity.

It will be appreciated that in pulsed-emission embodiments, known forms of electronic circuitry could be used to identify when any of the output states of the detectors has an amplitude variation greater than a defined threshold level and a frequency substantially identical to the pulse frequency of the light-emitting sources.

The circumscribing light curtain is created by a plurality of infrared LED emitters, or by other means, such as multiple light-emitting sources created by one or more emitters and an optical fiber transmission system that delivers source emissions at desired locations. The emitters are situated below the top surface of the rim, in a channel circumscribing the container opening. A multi-lens, transparent, plastic ring is placed into the channel, above the emitters. The bottom surface of the ring (facing the emitters) is comprised of a series of lenses, one for each emitter.

Each emitter transmits infrared radiation to only one of the ring's lenses. Molded-in, opaque, non-reflective walls in the housing segregate each emitter/lens pair into individual sections, and block infrared emissions from being transmitted to, or received from, other emitter sections. Each lens has an emitter situated at its focus, such that all emitted light impingent on the lens is refracted into a collimated, vertical light beam.

The top surface of the ring is planar and oriented with its surface normal pointed vertically. The vertical, collimated light refracted by the lenses strikes the horizontal top surface at right angles, and so continues through unrefracted, in a vertical direction.

The multiple, collimated, light curtain segments (one segment for each emitter) are joined end to end by the fixed configuration of the ring, and arranged so as to form a continuous light curtain (i.e., detection zone), fully circumscribing the can opening and extending vertically upward according to the maximum detection height set by the adjustable system sensitivity control.

A second embodiment of the ring allows for a non-horizontal top surface so the ring surface can follow the surrounding contour of the container rim, which may vary in the vertical dimension (as viewed in cross-section). In this case, each lens segment and emitter pair would be oriented so that the collimated light from the lens strikes the top surface at the required angle so as to cause refraction of the output light in a vertical direction.

A third embodiment of the ring provides a secondary, circumscribing light curtain around the container opening, in addition to the primary, vertical light curtain. In this embodiment, the ring's top surface is comprised of two circumscribing surfaces, each receiving a portion of the collimated light refracted from the lower lens surfaces. The primary surface is oriented, as described above, to create a collimated, vertical light curtain around the container opening. The secondary surface is oriented such that the light from the lower lenses strikes at a prescribed angle, thereby refracting inwards, towards the container opening, at a given angle to vertical.

The secondary, inwardly-angled, light curtain provides additional detection coverage within the outer light curtain's interior to illuminate and detect objects that may enter the interior of the detection zone via a path above the maximum height of the outer, vertical light curtain before dropping into the interior zone. The secondary light curtain is angled such that at maximum emitter output and detector sensitivity, the detection zone thus created does not extend beyond the vertical boundary of the primary light curtain.

The ring is a relatively inexpensive, unitary, molded plastic part that contains all lens elements and emitting surfaces in fixed orientations relative to each other, thereby obviating the need for multiple, precision optical components and/or individual adjustment of the optics to create a continuous, uniform light curtain surrounding the prescribed area.

A fourth embodiment of the ring adapts the concepts described in the previous embodiments to define a detection zone that only partially circumscribes an enclosed area. In some applications, waste containers may be partially recessed into walls or situated with one side flush against a wall, so that only a portion of the container rim protrudes beyond the wall surface. These configurations only require a detection zone that extends from that portion of the rim that is exposed beyond the wall surface—i.e., the physical barrier of the contiguous wall obligates all incoming objects to pass over the exposed rim before gaining access to the container opening. Furthermore, the adjoining wall structure might be configured such that it would interfere with the detection zone if the zone were to completely circumscribe the container opening. Reflections of emitted radiation from the wall may make it difficult to achieve optimum detection sensitivity while simultaneously avoiding false triggerings.

To create a partially circumferential detection zone, the ring itself would be partial and would only match the profile of the exposed portion of the rim. The lenses and top surface(s) of the partial ring would be configured as described above, in conjunction with properly oriented emitters and opaque separator walls, to create the desired light curtain(s). The light curtain(s) would then only emanate from the exposed rim section, yet provide full coverage for all objects entering the container.

Another aspect of the invention comprises a waste container with an upward-facing opening (though the same principles described herein may be applied to openings at any given orientation). The doors covering the opening may be configured, driven and guided in many ways according to known art. In the preferred embodiment, the opening has motor-driven, flexible doors that slide together to seal off the opening or are driven to separate in order to gain access to the container interior. The doors can be constructed from flexible, molded plastic material and have a series of drive engagement features, such as gear teeth, formed into one surface. Drive motors are mounted within the container housing module. Pinions mounted on the drive motors mesh with the doors' gear teeth, thereby providing engagement for the motors to drive the doors in either direction. The doors are deflected by guide elements and directed vertically downward along the sides of the can, thereby minimizing the can's operating footprint. Alternative guide paths that minimize operational volume may also be used, such as curved trajectories that direct the flexible doors into spiral, winding patterns. Actuation of opening and closing operations of the door motors is controlled by electronic and logic circuitry, in conjunction with object-detecting signals received from the detection system.

In order to facilitate the tossing of refuse into the container, the doors may be driven at high speed, so they open before incoming objects would otherwise make contact. To minimize the power draw of the motors during high accelerations, elastic spring elements can be utilized to provide additional motive energy. The spring elements are deformed to store energy during the door-closing phase, when the doors are driven at slower speeds and power draw of the motors is lower. One or more controllable clutches are required to restrain the spring elements and prevent the dissipation of stored energy prematurely.

Upon initiation of the door-opening phase, the clutches are released and the spring elements are free to unwind or decompress. The springs are mechanically coupled directly with the doors, or with the door drive systems, to augment the motive energy supplied by the motors and accelerate the doors at higher rates.

The spring elements may take a variety of forms, such as coil wire compression springs, that are linearly compressed during closing via direct mechanical coupling means with the doors. Alternatively, torsion springs may be used by grounding one end to the fixed housing and the other end to the motor shaft. Closing rotations of the motor shaft winds the spring to store energy. An electromechanical clutch, also grounded to the housing and coupled with the motor shaft, restrains the motor shaft during the door-closed phase, thereby preventing the torsion spring from unwinding. During door opening, the clutch releases the motor shaft and the torsion spring uncoils to release its energy and drive the motor shaft.

Appropriate emitters and detectors can be utilized to create detection zones comprised of forms of radiated energy other than infrared light (e.g., electromagnetic radiation at other wavelengths). Additionally, the detection zones described herein may be readily adapted to other applications besides an automatic waste container. Detection zones bounding other perimeters, such as automatic water fountain rims, automatic doors for pet self-feeding or waste disposal systems, and various industrial and security applications requiring controlled perimeter sensing around defined areas, may be created utilizing the aforementioned technology adapted to the specific configuration and requirements of the target system.

Thus, one aspect of the invention is a system for detecting objects within one or more defined volumes of space, the system including a plurality of light-emitting sources, an optical element for directing emitted light from the light-emitting sources to be transmitted within, and emitted from one or more surfaces of, the optical element into a plurality of zones of substantially collimated light, the zones having a combined profile of emission from the emitting surfaces of the optical element that fully or partially encloses a defined area, with at least two of the profiles of emission being non-linear in relation to each other, the plurality of zones being substantially joined end to end, thereby combining to define one or more substantially continuous volumes of space, or detection zones, fully or partially surrounding, and extending outwards from, the perimeter of the defined area, whereby objects within the detection zones are illuminated by portions of the emitted light, and whereby portions of the light illuminating the objects are reflected from the surfaces of said objects, and at least one detector sensitive to the reflected light is situated in locations proximate to the defined area, whereby portions of the reflected light from the objects illuminate said detectors, the detectors having output states that vary in response to the illumination of the detector by the reflected light.

Another aspect of the invention includes a plurality of primary optical surfaces composed of discrete portions of the surface area of the optical element wherein each of the primary optical surfaces has a focal point with one of the light-emitting sources substantially located at the focal point, whereby that portion of the emitted light from the light-emitting source that strikes the primary optical surface is refracted into a substantially collimated beam of light, wherein each of the collimated beams is transmitted within the optical element to one or more of the emitting surfaces of the optical element.

In one aspect of the invention, at least one of the emitting surfaces is situated at right angles to one of the collimated beams within the refractive element, and the collimated beam falls incident upon the emitting surface at right angles, whereby the collimated beam continues at right angles to the emitting surface upon exiting. In another aspect, at least one of the emitting surfaces is situated at a non-normal angle to one of the collimated beams within the optical element and the collimated beam falls incident upon the emitting surface at a non-normal angle, thereby being refracted upon exiting the emitting surface into a collimated beam at a defined angle to the emitting surface. In a further aspect, the light-emitting sources receive light energy from one or more remote, primary sources via an optical fiber transmission system. In another aspect, each of the light-emitting sources emits light to only one of the primary optical surfaces, and the light-emitting sources are located substantially at the focal points of the primary optical surfaces. In still another aspect of the invention, each of the light-emitting sources emits light to a plurality of the primary optical surfaces, which share a common focal point; the light-emitting source is located substantially at the common focal point; and each of the primary optical surfaces that receives light from one of the light-emitting sources is comprised of non-contiguous ones of the primary optical surfaces.

The system also can include physical boundary walls, substantially opaque to, and non-reflective of, light emitted from the light-emitting sources, and the boundary walls are configured so as to prevent illumination of the primary optical surfaces by any of the light-emitting sources that are not located substantially at the focal points of the primary optical surfaces.

The invention can include electrical control elements for pulsing the emitted light from the light-emitting sources at a defined frequency, and electrical circuitry for identifying when any of the output states of the detectors has an amplitude variation greater than a defined threshold level and a frequency substantially identical to the pulse frequency of the light-emitting sources.

In one practice of the invention there is a maximum distance from the emitting surfaces of the optical element at which reflections of the emitted light from objects within the detection zones illuminate the detectors with sufficient radiant energy to cause at least one of the output state levels of the detectors to be greater than the threshold level. In this case, the system will include electrical circuitry for identifying when any of the output states of the detectors has an amplitude greater than the threshold level, and electrical control elements for adjusting the maximum distance by varying the amplitude of light energy emitted by the light-emitting sources (or for adjusting the distance by varying the set value of the threshold level).

The invention can also be embodied in a container including an opening through which objects are inserted into the interior space of the container, one or more movable doors that close to substantially cover the opening and open to expose the opening of the container, elements for detecting objects within one or more volumes of space, such volumes of space having (1) base profiles proximate to, and partially or fully surrounding, the opening, and (2) substantially parallel sides extending outwards from the base profiles in a direction of increasing distance from the container. Electrical control and electromechanical motive elements are provided for causing the doors to open when objects are detected within such volumes of space. In another aspect, such containers can include the systems described above, thus creating volumes of space for detecting objects.

A container according to the invention can also include spring elements and mechanical coupling elements arranged so that the spring elements deform and store elastic energy during the closing motion of the doors, and then controllably release the stored energy to provide motive energy to drive the doors open. Electrical control elements can be provided for causing the electromechanical motive elements to close the doors after a set time period (which can be adjusted) during which the output levels of the detectors are less than the threshold level (i.e., corresponding to non-detection of objects in the detection space).

The container can also include guide elements to direct the flexible doors to deform when opening and closing, whereby the doors are guided into configurations proximate to one or more of the sidewalls of the container when in the open position. The door elements may include drive engagement surfaces that engage drive engagement surfaces of motors or other drive elements, to generate and apply forces to cause the doors to move.

Finally, the container may also include detector elements for detecting one or more defined positions of the doors, a first electrical control module for regulating a mechanical motive means for driving the doors according to the output states of the detectors; indicators providing a visible or audible signal for indicating when at least one of the output states of the detectors exceeds a threshold level, and a second electrical control module for setting modes of operation of the doors. Such modes may include a mode wherein the doors open in response to the output state of at least one of the detectors exceeding said threshold level; a mode wherein the doors remain in an open position irrespective of output state of the detectors; and a mode wherein the doors remain in a closed position irrespective of output states of the detectors.

DESCRIPTION OF ILLUSTRATED EMBODIMENTS

Figure 1:
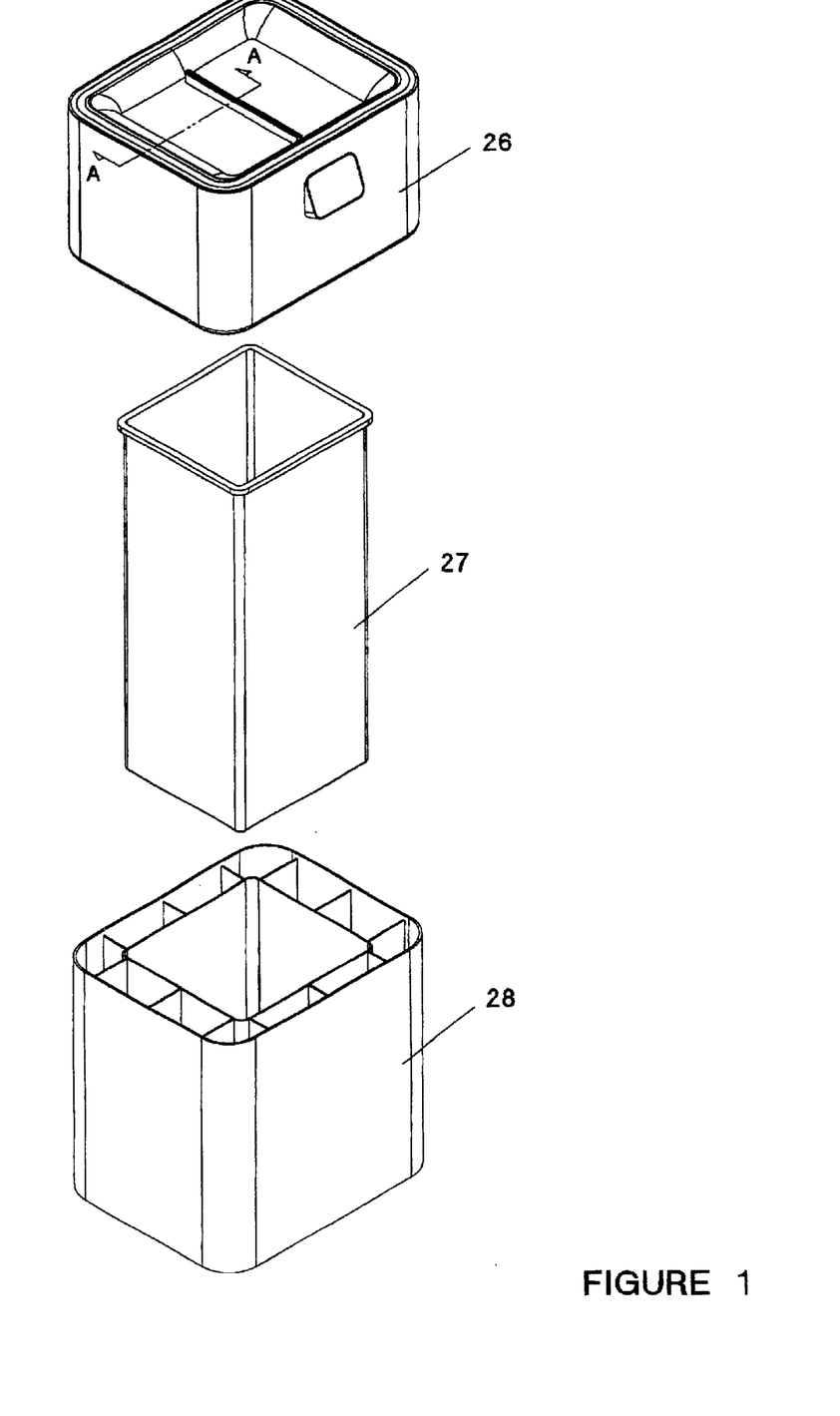
FIG. 1 is an exploded view of a container having automatic actuation features in accordance with the present invention.

FIG. 1 shows an exploded view of one embodiment of an automatic waste container utilizing the detection system of the present invention. A receptacle 27 for containing discarded refuse is fitted to a support base 28. A housing module 26 is placed over the rim of the receptacle 27, thereby covering the opening of the receptacle 27. The housing module 26 covers a substantial portion of the upper sidewalls of the receptacle 27, and so also serves to cover the exposed upper portions of a disposable plastic bag, of the type which may be used to line waste container interiors.

Figures 2A, 2B:
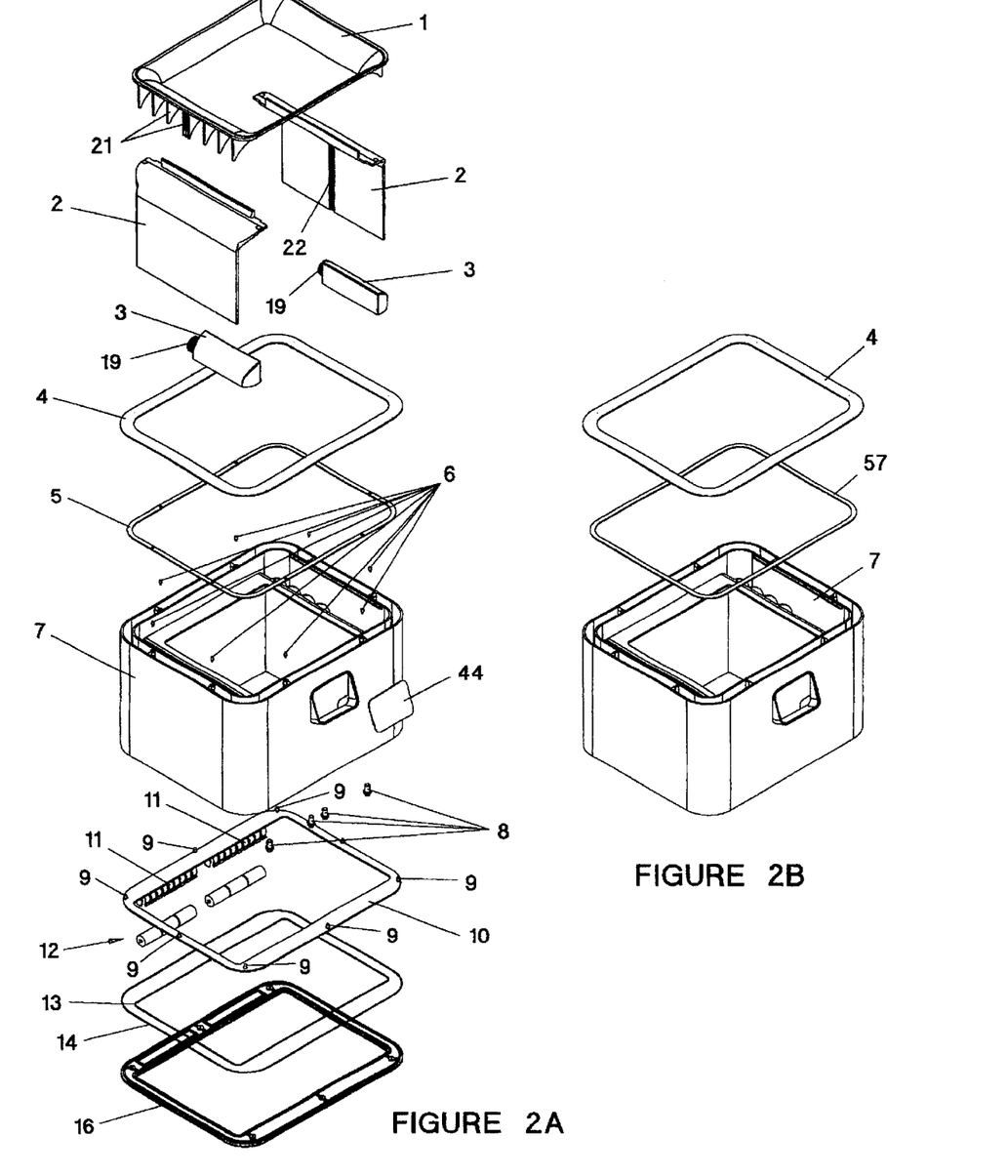
FIG. 2A is an exploded view of the housing module of the container of FIG. 1.
FIG. 2B shows another embodiment of the housing module of the container of FIG. 1.

FIG. 2A shows an exploded view of the housing module 26. The main structural component is the housing 7. The housing 7 is a plastic, injection-molded part, as are the other structural components, bezel 1 and bottom cover 16. The walls and ribs of the housing 7 create multiple interior spaces. Eight of the interior spaces circumvent the opening of the housing 7, which is situated directly above the opening of the receptacle 27.

Figure 3:
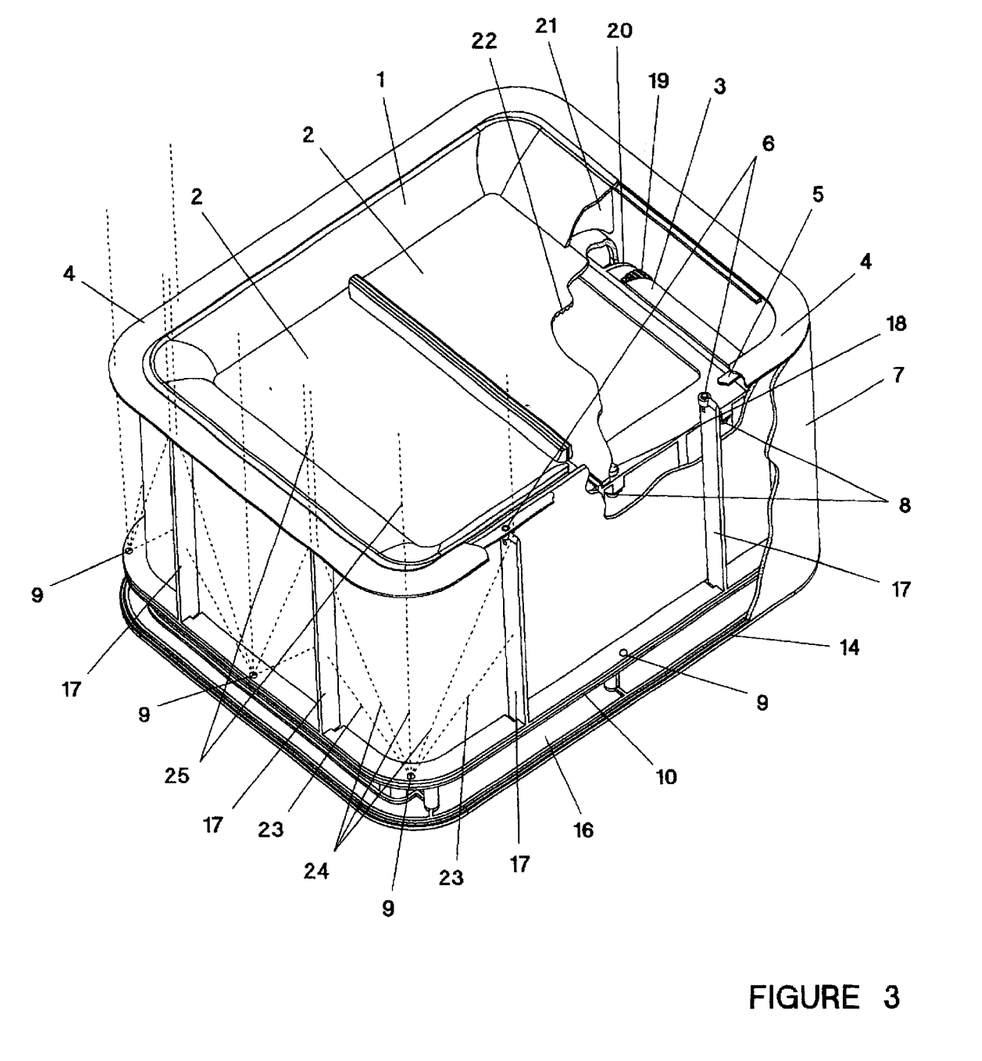
FIG. 3 is a cutaway view of the housing module of the container of FIG. 1.
Figure 4:
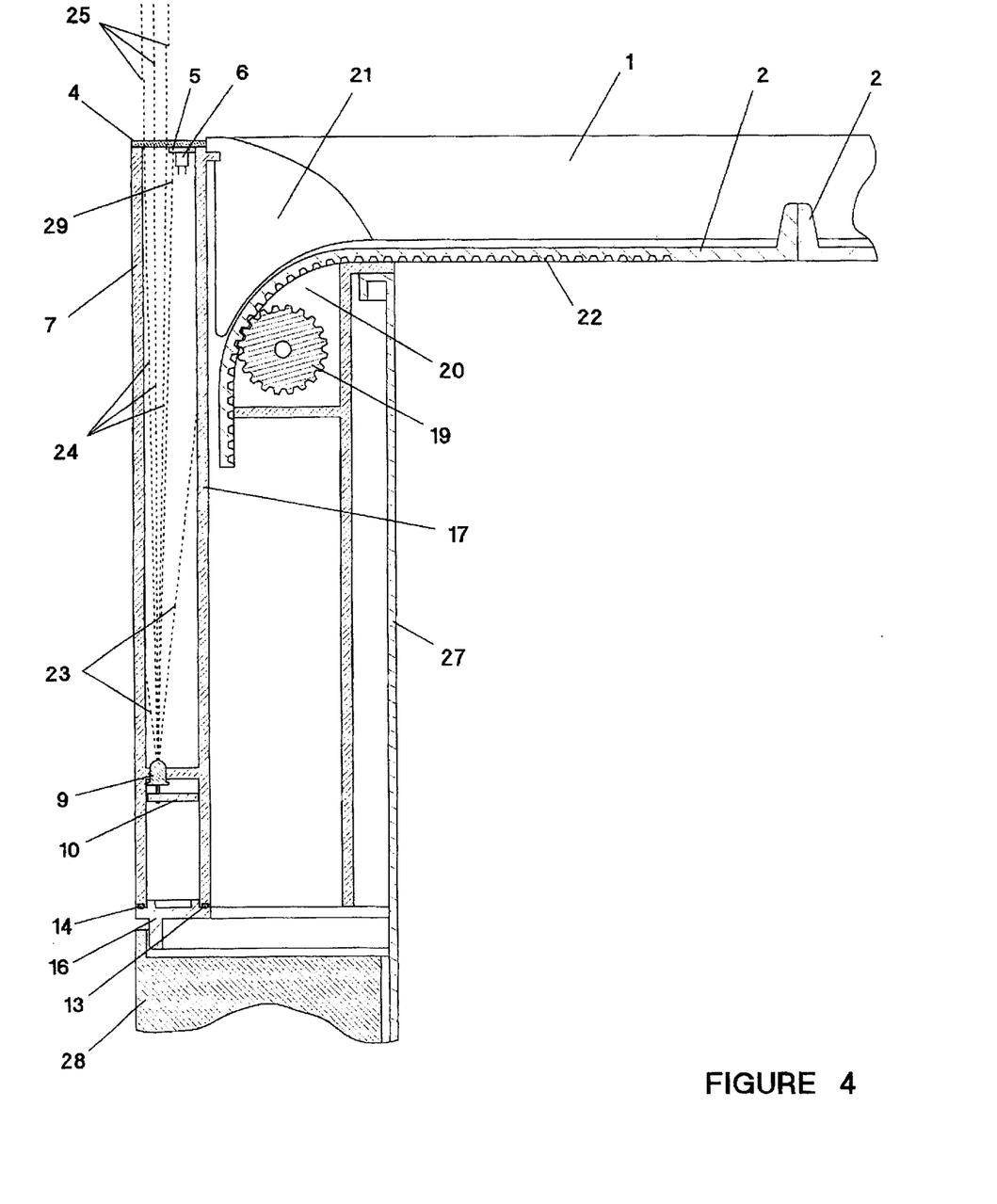
FIG. 4 is a cross-section view showing detail of elements in the housing module of the container indicated by the section lines A—A of FIG. 1.

The cutaway view of the housing module 26 shown in FIG. 3 reveals the separate, interior compartments arrayed around the perimeter of the housing 7. One light emitting diode, or LED, 9 is situated at the bottom of each compartment. At the top level of the compartments are located one or more photodetectors 6, distributed around the housing opening. The photodetectors 6 are sensitive to electromagnetic wavelengths corresponding to the LED emissions, and are situated to detect those LED emissions that illuminate surfaces of objects passing over a defined perimeter surrounding the housing opening, which are reflected back to the photodetectors 6 with sufficient energy to cause the output level of the photodetectors 6 to rise above a defined threshold level indicating detection.

The number of photodetectors 6 used may be varied according to their sensitivities and field of view characteristics. Detector sensitivity defines the minimum light energy required to strike the photosensitive surface and cause the detector's output level to rise above a defined threshold. Objects to be detected may vary considerably in reflective properties. Thus the photodetectors 6 receive sufficient light energy for activation from highly reflective objects at greater distances than comparable objects with lower reflectivities. This also implies that the minimum size of highly reflective objects that are capable of being detected at a given distance is smaller than the minimum detectable size of low reflectivity objects at the same distance. Thus photodetector 6 sensitivities and numbers may be matched to provide the required system sensitivity for detecting objects of desired minimum reflectivity and size.

The light energy reflected from objects in the detection zone is also a function of the output light energy levels of the LED's 9. Higher illumination output levels cause higher levels of light energy to be reflected back from object surfaces to the detectors 6. Thus increased LED brightness permits detection of objects at greater distances from the photodetectors 6. It is desirable to control the maximum detection distance in order to avoid false triggerings by the presence of nearby structure, objects or zones of activity situated in the area above the automatic waste container. The preferred embodiment is provided with a control panel 44, as described below, for the user to adjust the LED brightness, and thereby set the effective detection zone height.

The fields of view of the photodetectors 6 define zones of space emanating from the photodetectors 6 within which direct line of sight reflected light emissions are capable of being detected. Fields of view of the photodetectors 6 overlap to insure continuous detection coverage around the housing opening. However, the fields of view are diverging zones, which overlap at some finite distance above the photodetectors 6. Zones between the detectors are thus created close to the housing opening, that are not within the fields of view of any of the photodetectors 6. Reflected emissions from objects within these zones are not capable of activating the photodetectors 6. To reduce the height of the 'dead zones' between detectors, detectors with greater angular fields of view are preferred. Additionally, more detectors may be used such that they are situated closer together, causing their fields of view to overlap closer to the detectors.

A light shield 5, comprised of a material substantially opaque to emissions from the LED's 9, is placed over the photodetectors 6. Open apertures are provided in the light shield 5 directly above the photodetectors 6 to permit full access to their fields of view.

The open ends of the eight housing compartments are completely covered and sealed off by a plastic collimating ring 4.

Figure 5:
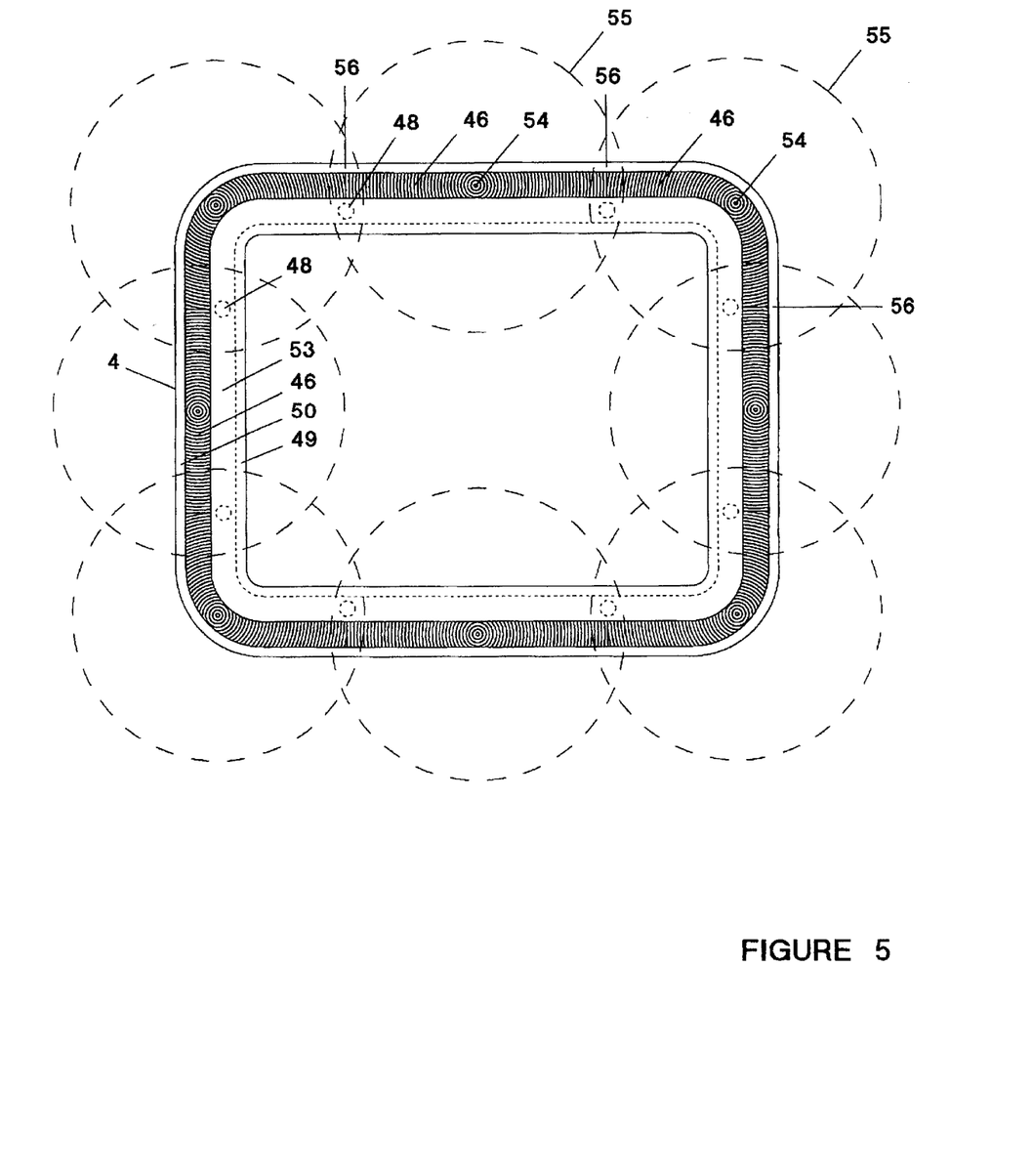
FIG. 5 is a plan view of the collimating ring.

FIG. 5 shows a plan view of the side of the collimating ring 4 facing the LED's 9. Inner peripheral zone 49 and outer peripheral zone 50 are joined directly to the housing 7 to make a continuous, watertight seal. This can be achieved via thermal or ultrasonic welding, and/or adhesive bonding. Adjacent to the inner peripheral zone 49 is the area 53 of the collimating ring 4 above the light shield 5. Areas 48 are directly over the photodetectors 6 and are clear, transmissive apertures for the photodetectors 6 underneath. Between the outer peripheral zone 50 and the projected light shield area 53 is an annulus comprised of multiple lens surface sections 46, one for each LED 9.

The lens surface sections 46 are preferably fresnel lens surfaces. Fresnel lenses greatly reduce bulk compared to conventional lenses of substantially equivalent optical properties, by collapsing adjacent zones of a lens surface into concentric rings. The concentric rings have surface profiles equivalent to annular segments of the corresponding continual lens surface, and combine in total to provide substantially equivalent optical performance to the corresponding continuous lens. The surface of a fresnel lens with the concentric rings is referred to as the grooved side. The opposing side is generally planar.

The optical center 54 of each fresnel lens section 46 is located directly above the corresponding LED 9, with the fresnel lens surface 46 at a distance equivalent to one fresnel lens focal length from the LED 9. With each LED 9 thus situated at the corresponding fresnel lens focal point, all emitted light 24 from the LED's 9 striking the corresponding fresnel surface 46 is refracted into a vertical, collimated zone of light 25 with a horizontal, cross-section profile substantially equivalent to the plan view profile of the corresponding lens section 46, as shown in FIG. 5.

The vertical, collimated light 25 exits unrefracted from the horizontal top surface 47 of the collimating ring 4. The profiles of the eight lens sections 46 are joined end to end, and combine to form a continuous annular zone around the housing opening. Thus a continuous, vertical zone of collimated light is created around a perimeter of the housing opening defined by the collimating ring 4.

It is desirable to have the grooved fresnel surface 46 facing inward toward the LED's 9 and the planar top surface 47 facing outward. With the grooved surface 46 facing in, it is protected from damage and exposure to contaminants which could easily get lodged between the grooves and prove difficult to clean out, thereby degrading optical performance. The smooth opposing plane 47 of the collimating ring 4, which can be more easily wiped clean of surface contamination, is thus preferred as the exposed top surface.

Fresnel lenses used for collimating light, with the grooved side facing the light source, are typically limited to apertures no greater than one focal length in diameter, due to rapid dropoffs in collection efficiencies and increasing aberrations in the collimated beam outputs beyond that range. FIG. 5 shows zones 55 of one focal length diameters centered around each fresnel lens section's optical center 54. Fresnel lens sections 46 of the collimating ring 4 are sized and configured such that all section borders are located within the corresponding one focal length, diametral zone 55 for that section. The boundaries 56 between adjacent lens sections 46 are located within the overlapping portions of the corresponding diametral zones 55. Thus all light 24 impinging on each lens section 46 from the corresponding LED 9 source is contained within the one focal length diametral aperture required for optimum fresnel collection efficiency and collimation.

The plastic material of the housing 7 and surface textures of internal walls 17 exposed to the LED's 9 are selected to be substantially opaque to, and non-reflective of, LED emissions. This insures that those emissions 23 from the LED's that strike the interior walls 17 of the housing 7 are blocked from illuminating other compartments or reflecting back onto the fresnel lens surfaces 46. Either condition could result in LED emissions striking the fresnel lens surfaces 46 at incorrect angles for producing collimated, vertical light and allow uncollimated, diverging light to exit the collimating ring 4. This could lead to the undesirable condition of illumination and detection of objects outside of the intended vertical, collimated detection zone surrounding the housing opening. The opaque light shield 5 also serves to prevent uncollimated, non-vertical light from exiting the collimating ring by blocking LED emissions 29 that strike the shield 5.

The housing opening, through which access is gained to the receptacle opening, is sealed closed by two sliding doors 2 which slide on surfaces of the housing 7 that run alongside the housing opening. The doors 2 are comprised of a flexible, molded plastic material and have a series of drive engagement features 22, such as gear teeth, formed into their undersurface.

Figure 6:
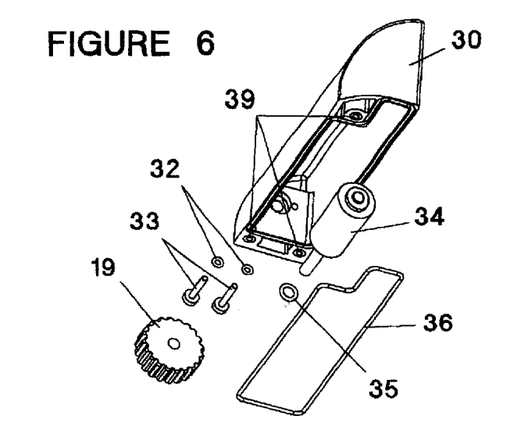
FIG. 6 is an exploded view of the motor module components.
Figure 7:
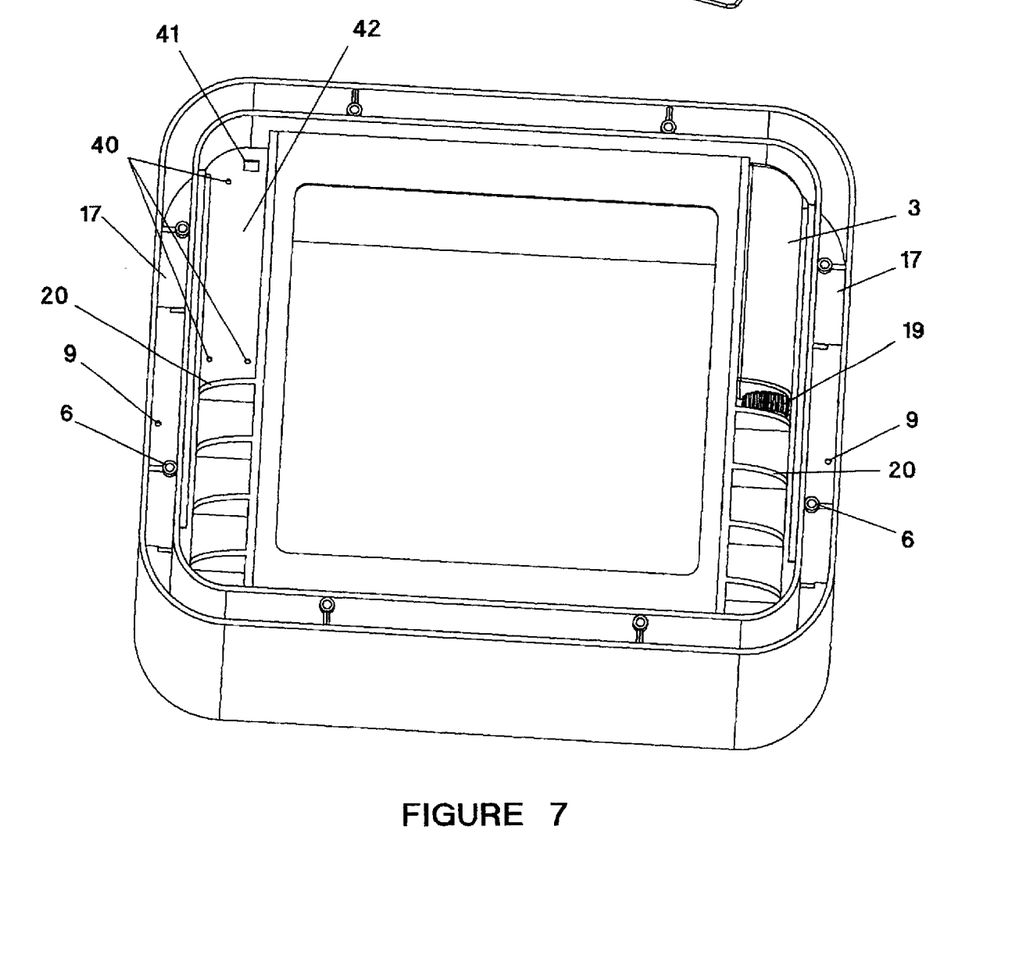
FIG. 7 shows the motor module of FIG. 6 fastened in place in the housing.

Two drive motor modules 3, one for each door 2, are mounted on opposite sides of the housing opening. FIG. 6 shows an exploded view of the motor module 3 components. FIG. 7 shows the motor module 3 of FIG. 6 fastened in place in the housing 7. The motor modules 3 contain electric motors 34 with exposed gears 19 rigidly mounted to the motor drive shafts. The gears 19 mesh with the doors' gear teeth 22, thereby providing engagement for the motors 34 to drive the doors 2 in either direction.

The doors 2 are driven by the motors 34 towards each other and make contact to effectively seal the opening of the housing 7, thereby preventing exposure to the receptacle's interior. The motors 34 are energized to drive the doors 2 open when one or more of the photodetectors' output levels rises above the threshold level indicating object detection. Motors 34 drive doors 2 closed after a defined time period of non-detection.

The motor 34 is mounted to the interior of the motor housing 30 with mounting screws 33. The output shaft of the motor 34 protrudes through the motor housing 30 with gear 19 rigidly mounted to it. Motor 34 is protected from exposure to liquids by deformable gasket seals provided by mounting screw o-rings 32, motor shaft o-ring 35 and motor housing gasket 36. Threaded fasteners (not shown) are inserted through openings 40 in the housing 7 and into threaded metal inserts 39 in the motor housing 30. Tightening the fasteners draws the motor housing 30 against the housing sealing surface 42, thereby compressing the motor housing gasket 36 and providing a watertight seal. Motor wire egress hole 41 in the housing, provides a path for electrical connection to the motor 34 within the sealed interior of the motor housing 30.

A bezel 1 is inserted into the top of the housing 7 over the doors 2. Guide surfaces 21 and 20 respectively, on the bezel 1 and the housing 7 direct the flexible doors 2 to deform vertically downwards along the sides of the receptacle 27 when the doors 2 are driven open to gain access to the receptacle interior. Such a guidepath minimizes the volume of space required for the doors' operation, and thereby reduces the automatic waste container's required operational footprint.

Hall effect sensors 8, which utilize a bias magnet technology to sense the presence of ferrous flux concentrators, are installed in the housing 7 through the bottom opening, prior to installation of the printed circuit board 10. The hall effect sensors 8 are fixed in positions directly below the sliding doors 2 and sense the proximity of ferrous inserts 18, which are molded into the sliding doors 2, as they slide by directly overhead during opening and closing motions of the doors 2. Signals from the hall effect sensors 8 indicating the proximity of the ferrous inserts 18 provide feedback signals to the motor drive circuitry to indicate when the doors 2 have achieved defined positions and corresponding opening or closing rotations of the door drive motors 34 are to be ramped down. The hall effect sensors 8 are situated such that the distance between the sensors 8 and the ferrous inserts 18 is fixed to be within the critical activation distance of the sensors 8. The housing 7 shields the hall effect sensors 8 from direct contact with the doors 2 or exposure to exterior contaminants.

The LED's 9 are mounted on the printed circuit board 10, which is inserted into the bottom opening of the housing 7 and fixed within the housing interior. The printed circuit board 10 also contains all control and drive circuit electronics for the LED's 9, photodetectors 6, hall effect sensors 8 and drive motors 34, as well as holders 11 for power supply batteries 12. Electrical connections from the LED's 9, photodetectors 6, hall effect sensors 8, drive motors 34 and front control panel 44 all terminate at the printed circuit board 10. Each of the LED's 9 protrudes through an opening at the bottom of each of the housing compartments and is substantially situated at the focus of the corresponding fresnel lens section 46.

The bottom cover 16 is fixed with threaded fasteners (not shown) to the housing 7 to seal off the exposed interior space containing all electrical components and connections. Deformable inner 13 and outer 14 gaskets are provided to create a watertight seal when the bottom cover fasteners are tightened and the gaskets 13 & 14 are compressed between the bottom cover 16 and housing 7.

The front control panel 44 has on-off and operational mode controls, as well as user-accessible controls for setting LED brightness and open door dwell time. A visual or audible indicator is provided to indicate object detection. Operational modes include: i) Normal—doors 2 open in response to object detection, ii) Closed—doors 2 remain closed, regardless of object detection status and iii) Open—doors 2 remain open, regardless of object detection status. The visual or audible indicator may be used in conjunction with either operational mode (ii) or (iii) so the user can test and adjust the effective detection zone height, without energizing the motors 34 to open the doors 2 each time a detection occurs.

Figure 8A:
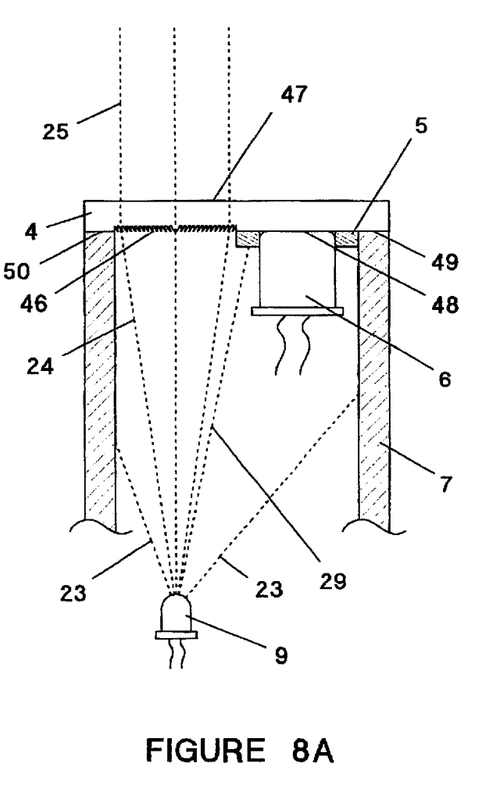
FIG. 8A is a cross-sectional representation of the housing and optical elements of the first embodiment.
Figure 8B:
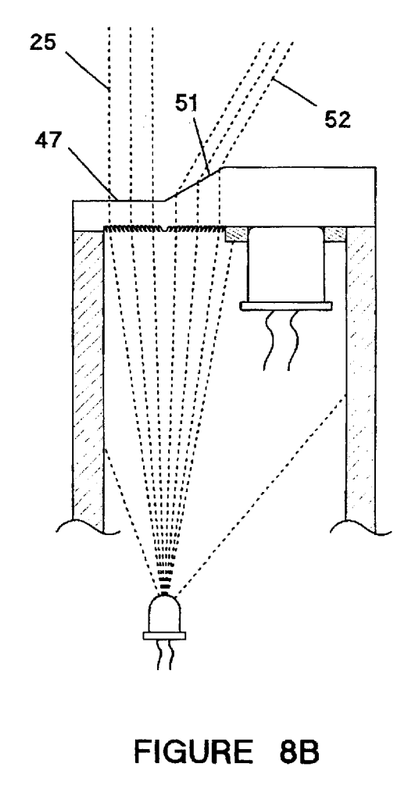
FIG. 8B is a cross-sectional representation of the housing and optical elements of the second embodiment.

In a second preferred embodiment, a secondary circumscribing, detection zone is created around the housing opening, in addition to the primary, vertical detection zone. FIG. 8B shows a cross-sectional representation of the housing and optical elements of the second embodiment. FIG. 8A shows a similar view of the first embodiment.

In the second embodiment, the top surface of the collimating ring 4 comprises two circumscribing surfaces 47 & 51 around the housing opening, each receiving a portion of the vertical, collimated light refracted by the underlying fresnel lens surfaces 46. The primary circumscribing surface 47 is oriented horizontally, and so permits the collimated light 25 to exit the collimating ring 4 unrefracted, in a vertical direction. The primary circumscribing surface 47 surrounds the secondary circumscribing surface 51. The secondary circumscribing surface 51 is oriented at a prescribed angle to horizontal, such that the vertical light from the lens surfaces 46 is refracted inwards towards the housing opening at a given angle to vertical. This creates a secondary, inwardly-angled zone of collimated light 52 surrounding the housing opening that provides additional detection coverage within the primary detection zone's interior to illuminate and detect objects that may enter the interior of the primary detection zone via a path above the maximum effective height of the vertical primary detection zone before dropping into the zone's interior. The secondary circumscribing surface 51 is oriented such that at maximum LED 9 output and detector 6 sensitivity, the detection zone thus created does not extend beyond the vertical boundary of the primary detection zone.

FIG. 2B shows a second embodiment of the housing module 26 wherein the photodetectors 6 and light shield 5 are replaced by a solar cell ring 57. The solar cell ring 57 is comprised of a large area photodiode, similar to those typically used in consumer products for powering small electric devices by converting ambient light energy impingent on the solar cell into an electrical output current. The solar cell ring 57 may be comprised of a single fabricated photodiode or a plurality of discrete photodiodes electrically interconnected and physically mounted to a common substrate. The solar cell ring 57 has an output current that rises when incident light energy is increased and so may be utilized to detect objects in the detection zone that reflect LED emissions back onto the solar cell ring 57. A greater area of the solar cell ring 57, compared to the plurality of photodetectors 6, is available for receiving reflected substantially collimated LED emissions. Thus detection zone performance is enhanced via increased gains in system sensitivity. The solar cell ring 57 may also be used to advantage to provide recharging energy, converted from ambient light, to the batteries 12. The use of the solar cell ring 57 also obviates the need for the light shield 5, due to the opaque underside of the solar cell ring 57, which blocks impingent diverging LED emissions from exiting the collimating ring 4 outside of the substantially collimated detection zone or zones 25 and/or 52.

We claim:

1. An automatic waste container for object disposal, comprising:
    a receptacle for disposal of objects;
    a housing module integrated in combination with said receptacle, said housing module configured to include a perimeter that defines an opening in said receptacle of said automatic waste container for object disposal;
    door means integrated in combination with said housing module that is movable between a closed position and an open position for the disposal of objects using said opening, said door means being configured to substantially cover said opening with said movable door means in the closed position;
    a plurality of light-emitting sources arrayed in combination with said housing module along, and in spaced-apart relation to, at least a segment of said perimeter of said opening, each of said plurality of light-emitting sources being operative to emit diverging light;
    a lens means integrated in combination with said housing module in spaced-apart relation with respect to said plurality of light-emitting sources so that the diverging light emitted by said plurality of light-emitting sources passes through said lens means to form a substantially continuous zone of substantially collimated light along said perimeter segment of said opening; and wherein said substantially continuous zone of substantially collimated light along said perimeter segment defines a detection zone for said opening wherein objects being disposed of that pass through said detection zone reflect said substantially collimated light from said lens means;
    detection means integrated in combination with said housing module in spaced-apart relation to said plurality of light-emitting means and said lens means, said detection means having a field of view that provides substantially continuous detection coverage for said perimeter segment to detect said reflected substantially collimated light from objects being disposed of in said opening of said automatic waste container and to provide a signal in response to detection of said reflected substantially collimated light from objects being disposed of; and
    electrical control and electromechanical motive means operative in response to said detection signal to cause said movable door means to open for disposal of objects being through said detection zone.

2. The automatic waste container of claim 1 wherein said detection means comprises a plurality of spaced-apart detectors arrayed about said perimeter segment.

3. The automatic waste container of claim 1 wherein said detection means comprises a solar cell ring.

4. The automatic waste container of claim 1 wherein said lens means comprises a plurality of lens surface sections arranged along said perimeter segment in one-to-one correspondence with said plurality of light-emitting sources.

5. The automatic waste container of claim 4 wherein each of said plurality of lens surface sections is a fresnel lens surface.

6. The automatic waste container of claim 5 wherein each said fresnel lens surface comprises a surface of concentric rings having an optical center, and wherein each said corresponding light-emitting source is aligned in spaced-apart relation from said optical center of said concentric rings surface.

7. The automatic waste container of claim 6 wherein the spaced-apart relationship between each said light-emitting source and said corresponding optical center of said concentric rings surface is substantially one fresnel lens focal length.

8. The automatic waste container of claim 6 wherein said concentric rings surface of each said fresnel lens surface are disposed in facing relation to said corresponding light-emitting source.

9. The automatic waste container of claim 8 wherein the surface opposite said concentric rings surface of each said fresnel lens surface is a substantially smooth surface that is substantially parallel to said concentric rings surface such that said substantially collimated light emanating from said substantially smooth surface is substantially perpendicular thereto wherein said substantially collimated light emanating from all said substantially smooth surfaces in combination defines said detection zone for said opening of said automatic waste container.

10. The automatic waste container of claim 8 wherein the surface opposite said concentric rings surface of each said fresnel lens surface is a substantially smooth surface that is angled with respect to said concentric rings surface such that said substantially collimated light emanating from said substantially smooth angled surface is refracted with respect thereto wherein said substantially collimated light emanating from all said substantially smooth angled surfaces in combination defines said detection zone orientated at a defined non-normal angle with respect to said angled surfaces.

11. The automatic waste container of claim 8 wherein the surface opposite said concentric rings surface of each said fresnel lens surface comprises a primary circumscribing surface and a secondary circumscribing surface, and wherein
    said primary circumscribing surface is a substantially smooth surface that is substantially parallel to said concentric rings surface such that said substantially collimated light emanating from said primary circumscribing surface is substantially perpendicular thereto wherein said substantially collimated light emanating from all said primary circumscribing surfaces in combination defines said detection zone for said opening of said automatic waste container, and wherein
    said secondary circumscribing surface is a substantially smooth surface that is angled with respect to said concentric rings surface such that said substantially collimated light emanating from said secondary circumscribing surface is refracted with respect thereto wherein said substantially collimated light emanating from all said secondary circumscribing surfaces in combination defines an inwardly-angled detection zone with respect to said opening of said automatic waste container.

12. The automatic waste container of claim 1 wherein said plurality of light-emitting sources are arrayed in combination with said housing module completely around, and in spaced-apart relation to, said perimeter defining said opening of said automatic waste container and wherein said lens means is an annular member surrounding said opening of said automatic waste container such that said detection zone defined by said substantially continuous zone of substantially collimated light completely surrounds said opening of said automatic waste container.

13. The automatic waste container of claim 1 wherein said electrical control means is operative to cause said electromechanical motive means to move said movable door means from the open position to the closed position after a predetermined period of time if no detection signal has been received by said electrical control means during said predetermined period of time.

14. The automatic waste container of claim 1 wherein said movable door means comprises two sliding doors formed of flexible material that are in abutting engagement when in the closed position and which move in opposite directions when said electromechanical motive means causes said two sliding doors to move to the open position.

15. The automatic waste container of claim 14 wherein said electromechanical motive means comprises a drive motor module for each of said two sliding doors that is integrated in combination with said housing module, and further wherein each of said two sliding doors includes drive engagement members in engagement with said corresponding drive motor module so that in response to the detection signal each said drive motor module interacts with said corresponding drive engagement members of said sliding door to move said two sliding doors between the open position and the closed position and vice versa.

16. The automatic waste container of claim 14 wherein said housing module further includes guide surfaces to direct said two sliding doors to deform adjacent opposed sides of said receptacle when said electromechanical motive means is operative to move said two sliding doors to the open position.

17. The automatic waste container of claim 14 further comprising
- spring means integrated in combination with each of said two sliding doors, each of said spring means being deformable during movement of said two sliding doors to the closed position; and
- mechanical coupling means integrated in combination with said spring means of each of said two sliding doors;
- wherein said mechanical coupling means is operative when said two sliding doors are moved to the closed position to prevent dissipation of energy stored in each said spring means due to deformation thereof; and
- wherein said mechanical coupling means is operative when said two sliding doors are moved to the open position to release the energy stored in each said spring means to accelerate movement of said two sliding doors to said open position.

18. The automatic waste container of claim 14 further comprising detector means for one or more defined positions of said two sliding doors, said detector means having output states corresponding to the one or more defined positions of said two sliding doors, and wherein said electrical control means is operative to regulate operation of said electromechanical motive means during movement of said two sliding doors according to said output states of said detector means.

* * * * *